July 28, 1931.   L. R. EWING ET AL   1,816,519
HARVESTING MACHINE
Filed June 28, 1929
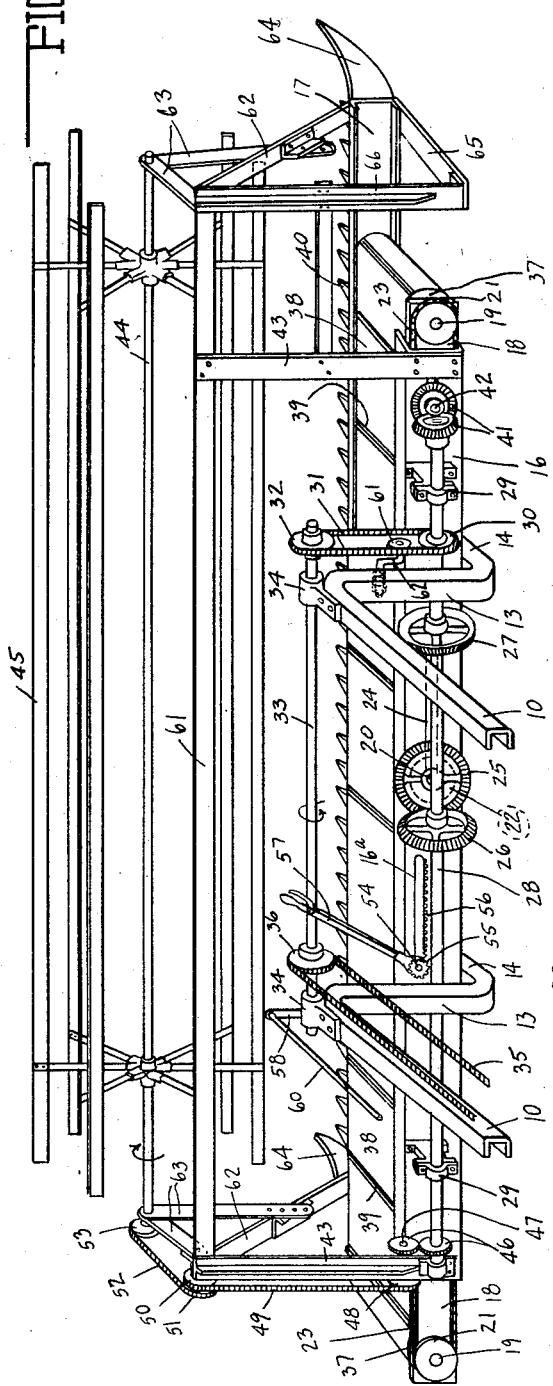
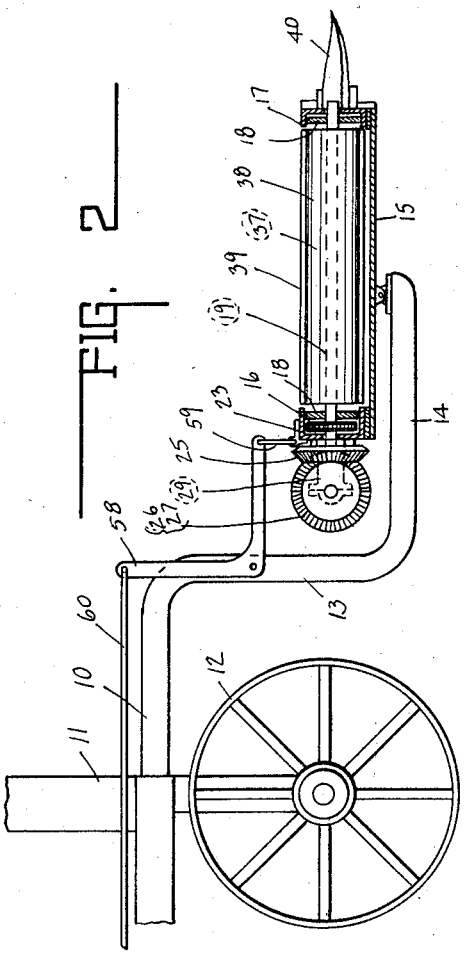
INVENTORS.
LON R. EWING.
THOMAS J. MECHLING.
BY Lockwood Lockwood
Goldsmith Gatt
ATTORNEYS.

Patented July 28, 1931

1,816,519

UNITED STATES PATENT OFFICE

LON R. EWING, OF KOKOMO, AND THOMAS J. MECHLING, OF BURLINGTON, INDIANA

HARVESTING MACHINE

Application filed June 28, 1929. Serial No. 374,553.

This invention relates to a harvesting machine, and particularly to a harvesting machine adapted to cut grain and automatically pile it in windrows properly disposed to be picked up by a windrow type of threshing machine.

With the type of harvesting machines wherein the grain is cut and shocked by a harvesting and binding machine, thrown off on the ground, then pitched on to a wagon and drawn to a stationary threshing machine, there is considerable loss of grain due to the repeated rough handling, particularly in the shocking operation and in the transportation to the thresher. In the method of operation combining the use of the harvesting machine herein disclosed with the windrow type of thresher, the handling of the grain is reduced to a minimum and consequently the handling loss is also reduced.

In using the so-called "combination machine", in which the harvesting and threshing are done by a single machine, considerable difficulty is always encountered in moving from field to field since these machines are in their nature of a large and unwieldy type. This is particularly important where fields are small and where fields are fenced and provided with the usual twelve foot gate openings. Another disadvantage of the combination type of machine resides in the fact that most grains should not be threshed immediately after cutting but should be allowed a proper drying period between cutting and threshing. These disadvantages are avoided by the use of the harvesting machine disclosed herein combined with the use of the windrow type of thresher both of which are of a size for convenient handling.

For the successful operation of the windrow type of threshing machine, it is necessary that the grain be disposed with the stalks extending longitudinally of the windrow and with the heads of the grain on the top of the windrow. It is also advantageous to have the grain from two swaths of the harvesting machine piled in adjacent windrows to be picked up by the thresher in a single circuit of the field. In order to accomplish the latter result, the present invention provides a harvesting machine which may be adapted to discharge grain from either the right hand or the left hand side of the machine. When the circuit of the field is made in a clockwise direction by the harvesting machine, the grain is discharged to the right on the first circuit and to the left on the second circuit. Provision is made for discharging the grain from the right side of the machine well within the cutover portion behind the cutting elements. When discharging from the left side of the machine, the grain is preferably discharged just clear of the end of the cutting elements, thus placing the two windrows adjacent each other. Succeeding pairs of circuits are similarly made.

The principal feature of the invention, therefore, resides in the provision of a harvesting machine adapted to cut the grain and discharge it in windrows either to the right or the left of the machine as desired, with the grain stalks parallel to the line of the windrow and with the heads of the grain on the top of the windrow.

The full nature of the invention will be understood from the accompanying drawings and the following description and claims:

Fig. 1 is a perspective view of the harvesting machine with the fastening elements used to attach the same to any standard form of farm tractor. Fig. 2 is a side elevation with parts removed to show other parts in detail.

A pair of supporting members 10 herein shown as channel beams are attached to a farm tractor 11 and extend forwardly of the front wheels 12 of the tractor. The supporting members 10 have downwardly-extending portions 13 and forwardly-extending portions 14. The portions 14 extend parallel to the ground and a short distance above the ground. Pivotally carried on each of the portions 14 are cross members 15 carrying at their opposite ends channel members 16 and 17. The member 17 extends transversely of the path of travel of the tractor to the full distance of the swathe to be cut. This distance will always be greater than the width of any portion of the tractor so that the tractor always travels on a cut-over portion of the field.

The rear channel member 16 is several inches shorter than the front channel member 17 and has one end directly behind the end of member 17, thus leaving the opposite ends of the two members disposed as shown at the right in Fig. 1.

Slidably carried within the channel members 16 and 17 are frame members 18 supporting a pair of shafts 19 and a single shaft 20. The frame members 18 are maintained in spaced relation to each by cross members not shown which form with members 18 a rigid frame work slidable within the channel members 16 and 17. Each of the shafts 19 carries a sprocket 21 and the shaft 20 carries a pair of sprockets 22. Each of the sprockets 21 carries a sprocket chain 23 engaging one of the sprockets 22 whereby rotation of shaft 20 causes rotation of both shafts 19. The shaft 20 extends through a slotted opening 24 in the channel member 16 and carries a bevel gear 25 adapted to selectively engage either of a pair of bevel gears 26 and 27. The gears 26 and 27 are mounted on a shaft 28 supported in bearings 29 upon the back of the channel member 16. The shaft 28 also carries a sprocket 30 driven by a chain 31 from a sprocket 32 carried upon a shaft 33. The shaft 33 is supported in bearings 34 upon supporting members 10 and is driven by means of a chain 35 and sprocket 36 from any suitable drive sprocket connected with the motor of the tractor. By this construction the shafts 19 may be selectively driven in either direction, depending upon which of gears 26 or 27 is brought into engagement with the bevel gear 25. The mechanism for selectively bringing these gears into engagement will be hereinafter described.

Each of the shafts 19 carries a pulley 37 over which is trained a conveyor belt 38 of canvas or other suitable material carrying cross bars 39 for the transportation of the grain. Forwardly of the channel member 17 are the usual cutters 40 driven from the shaft 28 by a pair of bevel gears 41, a cross shaft 42 and other suitable gearing of a standard type not disclosed in the drawings. Dividers 64 of the usual form draw the grain to the cutters from several inches beyond their ends.

Mounted at the two ends of rear channel member 16 are upright frame members 43 supporting at their upper ends a cross member 61. Attached to the cross member 61 and the front channel member 17 are frame members 62 in turn supporting frame members 63 carrying a shaft 44 and the usual type of harvesting reel 45. The reel is driven from the shaft 28 by means of a pair of gears 46, a shaft 47, sprocket 48, chain 49, sprockets 50 and 51, chain 52 and sprocket 53.

In the operation of the machine in the relation shown in Fig. 1 the grain cut by the cutters falls upon the conveyor with the heads of the grain pointing toward the rear of the machine. The conveyor is moving to the right and, therefore, deposits the grain in a windrow at the right hand side of the machine well within the cut-over space. The grain cut by the cutters at the right hand side falls directly into the windrow. The length of the conveyor is such that the windrow is deposited out of the path of the tractor. Since the heads of the grain fall upon the rear edge of the conveyor, as the machine progresses, the grain deposited on the windrow will be deposited on the stalk portion of that already in place and not on the heads. Thus the heads of the grain are left on the top of the windrow where they may be quickly dried.

Mounted in one of the frame members 18 and extending through an opening 16$^a$ in the channel member 16 is a pin 54 rotatably carrying a gear 55 adapted to mesh with the rack 56 carried on the channel member 16. A ratchet lever 57 is adapted to rotate the gear 55 and thereby move the members 18, the conveyor belt 38 and the gear 20 to the right or left as desired. The first circuit of a field is made in a clockwise direction with the conveyor positioned as shown in Fig. 1 discharging the grain to the right. At the start of the second circuit of the field the lever 57 is operated to move the conveyor belt and the gear 20 to the right bringing the gear 20 into engagement with the gear 27. In this position the direction of travel of the conveyor belt is reversed and the grain is discharged to the left. The conveyor is preferably made of the proper length to terminate directly behind the end of the cutter blades when operating to the left. The grain will therefore be discharged just beyond the end of the cutting elements. In this manner the grain cut on alternate circuits of the field will be deposited in windrows adjacent to each other and positioned to be simultaneously picked up by a single circuit of the threshing machine. When operating to the left, the ends of frame members 18 at the right side of the machine are supported upon a cross member 65 in turn carried by front channel member 17 and a depending support member 66. Thus the grain cut by the right hand end of the cutting elements will fall upon the conveyor and be transported to the left.

For lifting the cutters clear of the ground in moving from field to field and for adjusting the height of the cutters above the ground for cutting, a bell crank 58 is provided mounted upon one of the support members 10, attached to the channel member 16 by a rod 59 and operated by the driver by means of rod 60. An idler sprocket 61 mounted upon a spring-actuated crank 62 engages the chain 31 and maintains the tightness thereof during the movement of adjusting the cutters.

The invention claimed is:

1. In a harvesting machine having grain-cutting elements, the combination of a framework movable respectively of said cutting elements, a conveyor carried upon said framework adapted to receive cut grain from said cutting elements and to discharge the same in a windrow at the side of the machine, means for reversing the travel of said conveyor, a trackway for said framework comprising a pair of oppositely-positioned channel-shaped members, and means for moving said framework upon said trackway whereby the windrow may be selectively placed at either side of the machine.

2. A harvesting machine including a transversely-movable frame, a pulley at either end thereof, a conveyor belt trained about said pulleys, a sprocket for driving each of said pulleys, sprocket chains for driving said sprockets, a trackway upon which said frame is movable, said trackway comprising a pair of oppositely-positioned channel-shaped members and said sprocket chains being adapted to travel within said channels, and means for shifting said frame upon said trackway and for simultaneously reversing the direction of movement of said sprocket chains whereby grain may be discharged in selected positions at either side of the machine.

In witness whereof, we have hereunto affixed our signatures.

LON R. EWING.
THOMAS J. MECHLING.